W. E. SIMPSON.
CONVEYER AND MOLD SEPARATOR.
APPLICATION FILED FEB. 14, 1921.
1,424,947.
Patented Aug. 8, 1922.
6 SHEETS—SHEET 1.
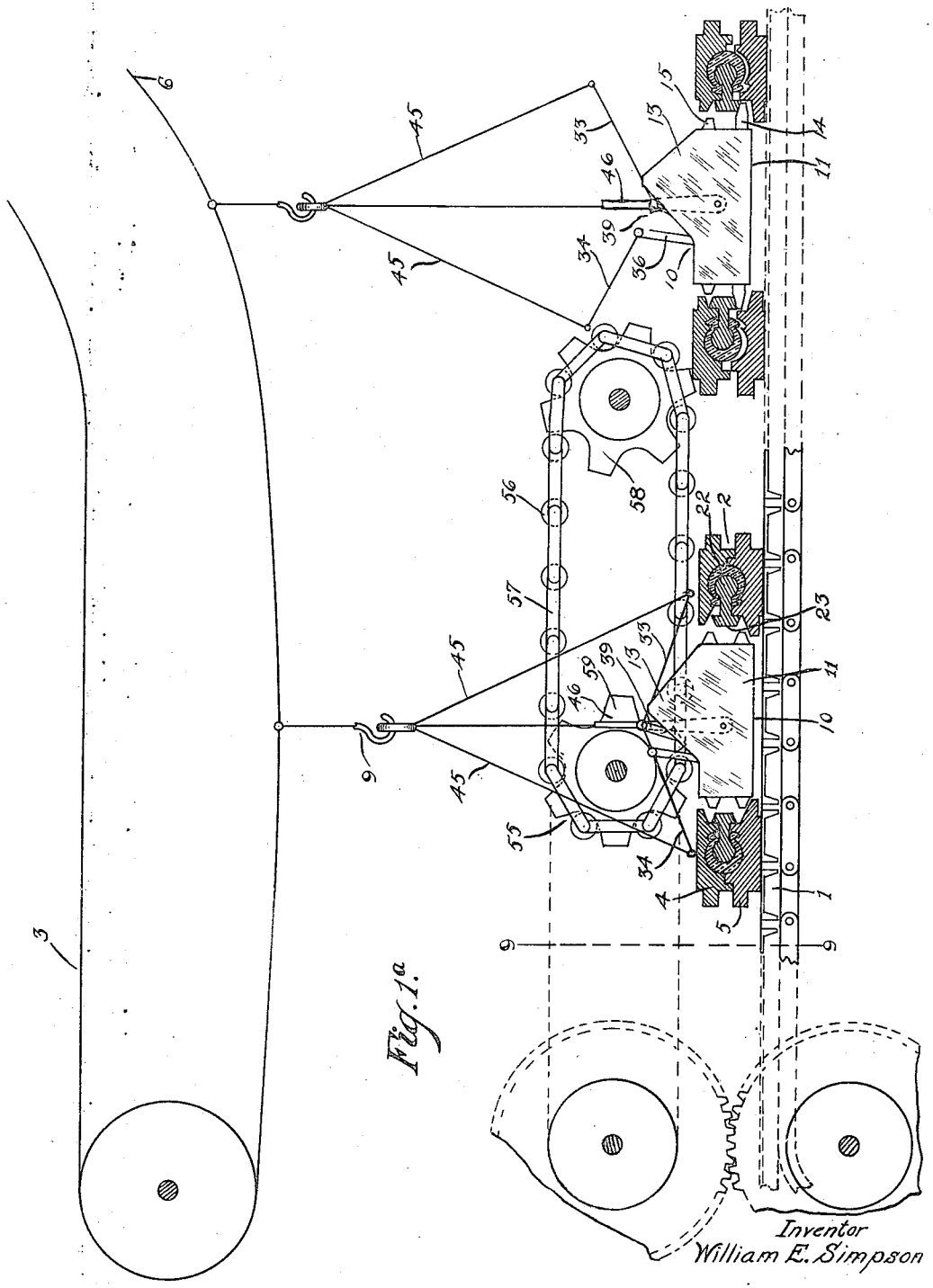
Fig. 1ª.
Inventor
William E. Simpson
By Whittemore Hulbert Whittemore
& Belknap, Attorneys W. E. SIMPSON.
CONVEYER AND MOLD SEPARATOR.
APPLICATION FILED FEB. 14, 1921.
1,424,947.
Patented Aug. 8, 1922.
6 SHEETS—SHEET 2.
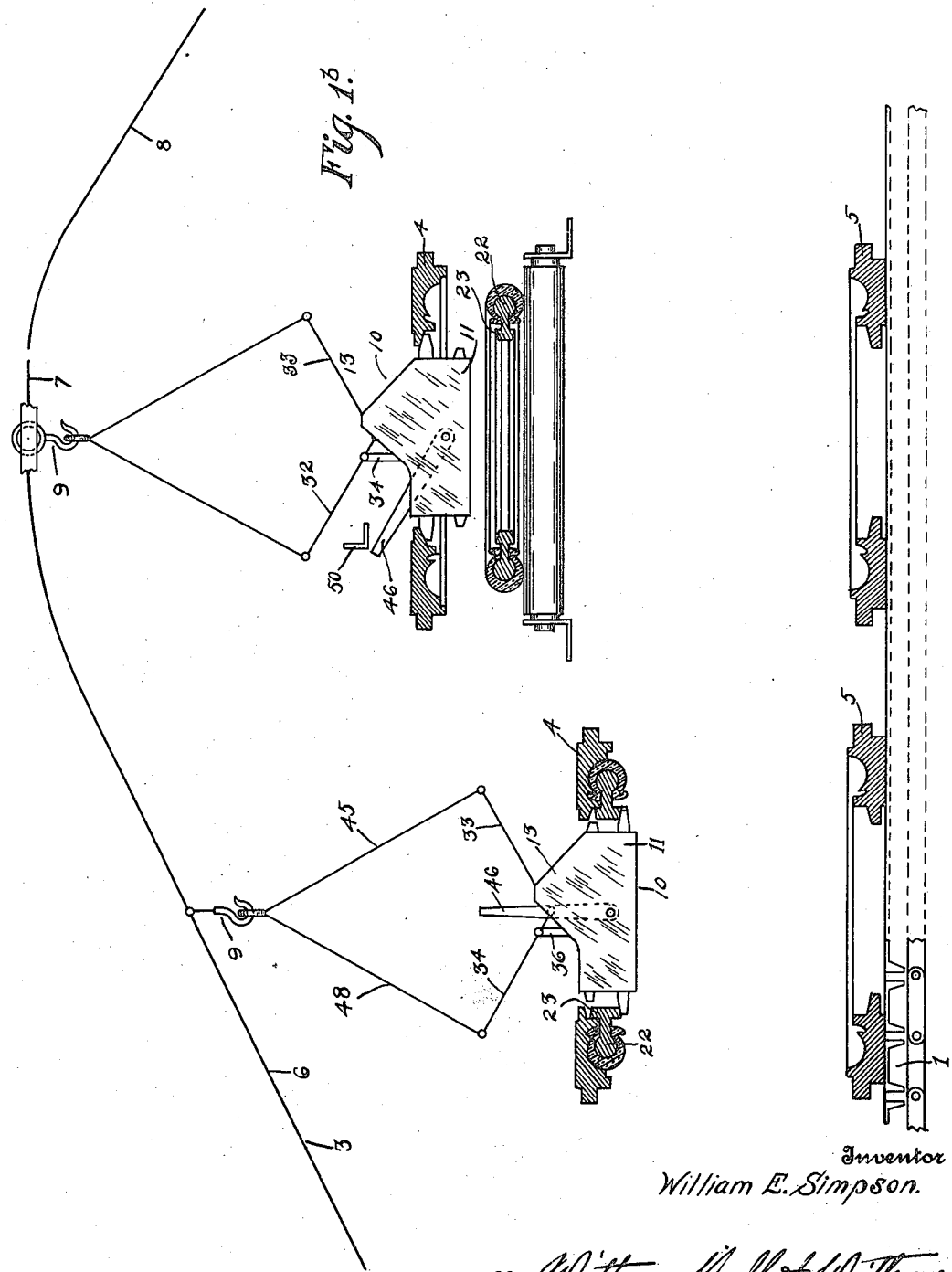
Inventor
William E. Simpson.
By Whittemore Hulbert Whittemore
& Belknap
Attorneys

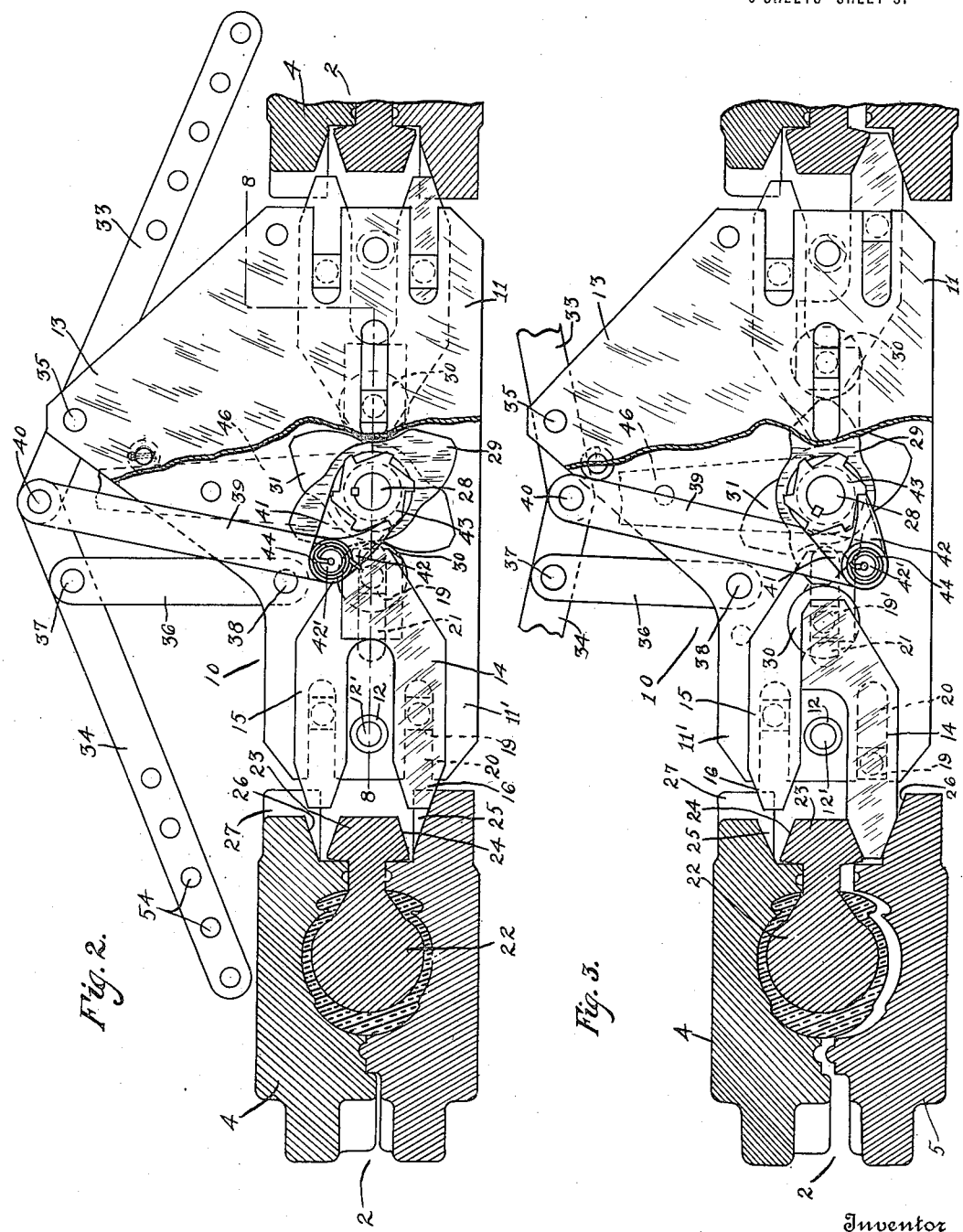

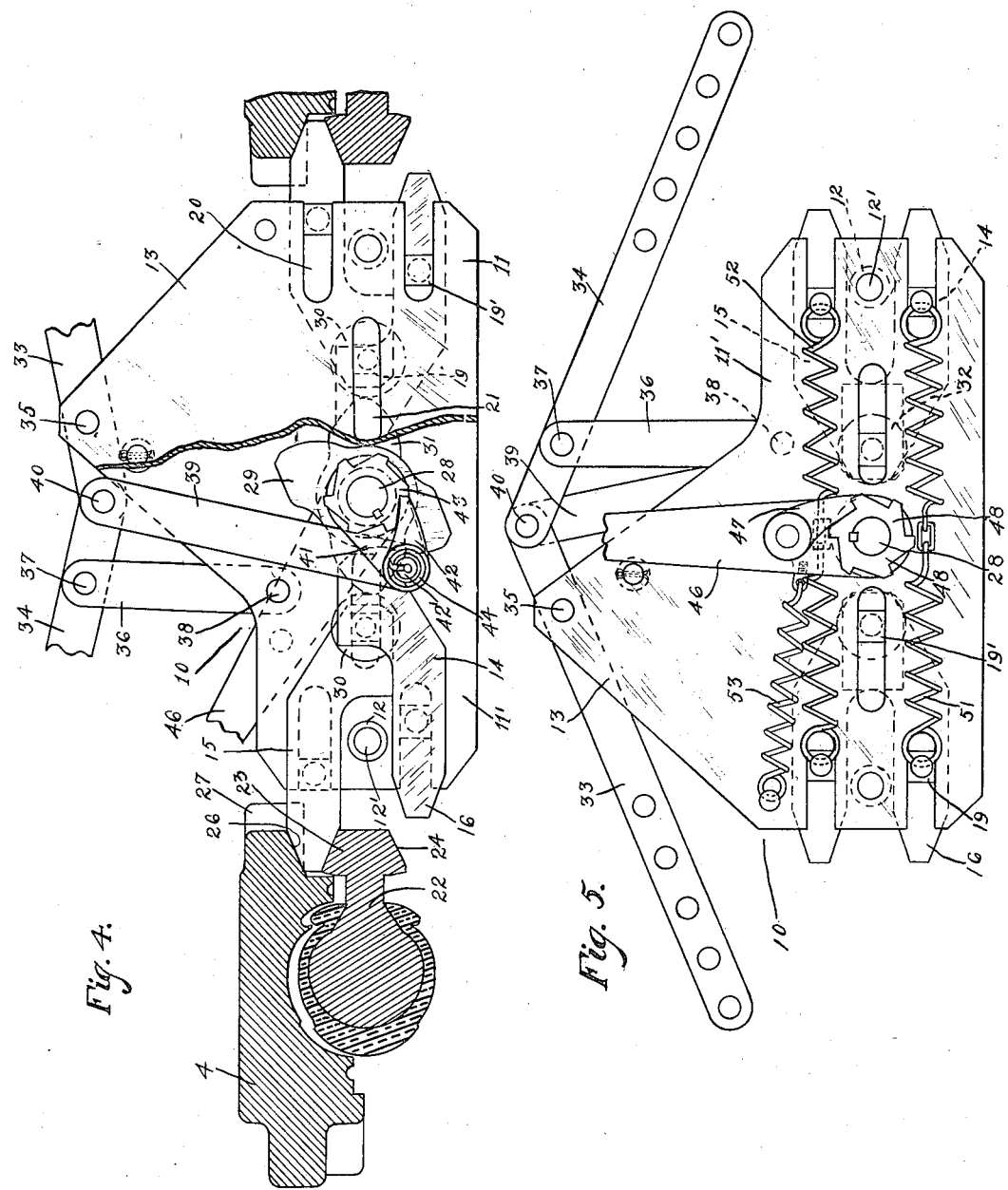

W. E. SIMPSON.
CONVEYER AND MOLD SEPARATOR.
APPLICATION FILED FEB. 14, 1921.
1,424,947.
Patented Aug. 8, 1922.
6 SHEETS—SHEET 5.
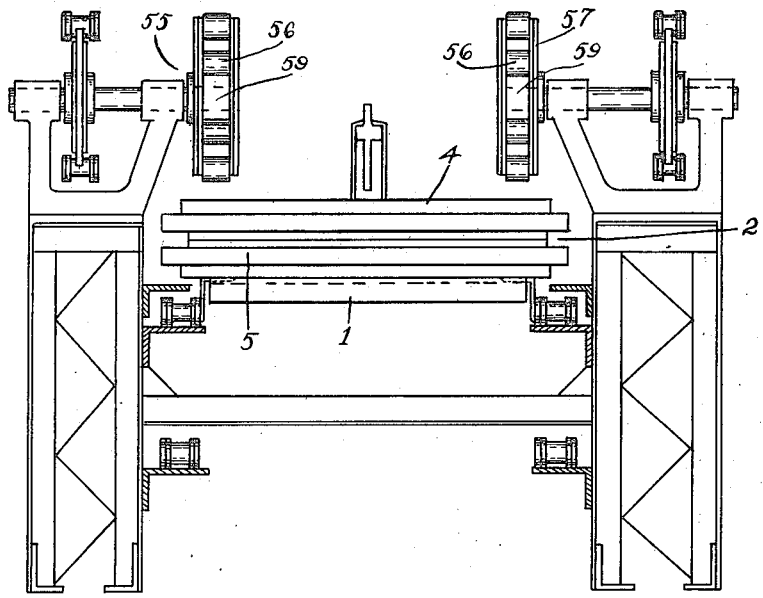
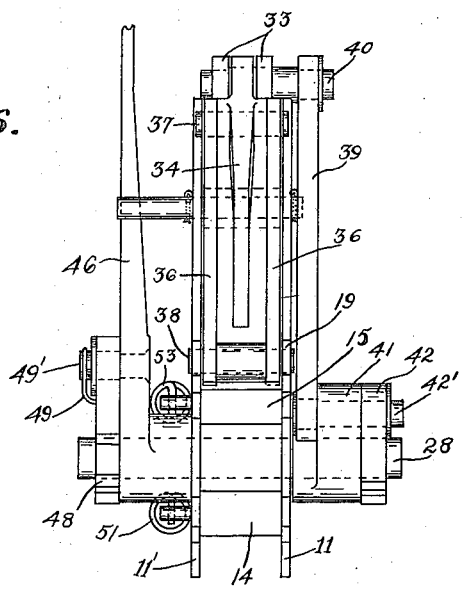
Inventor
William E. Simpson

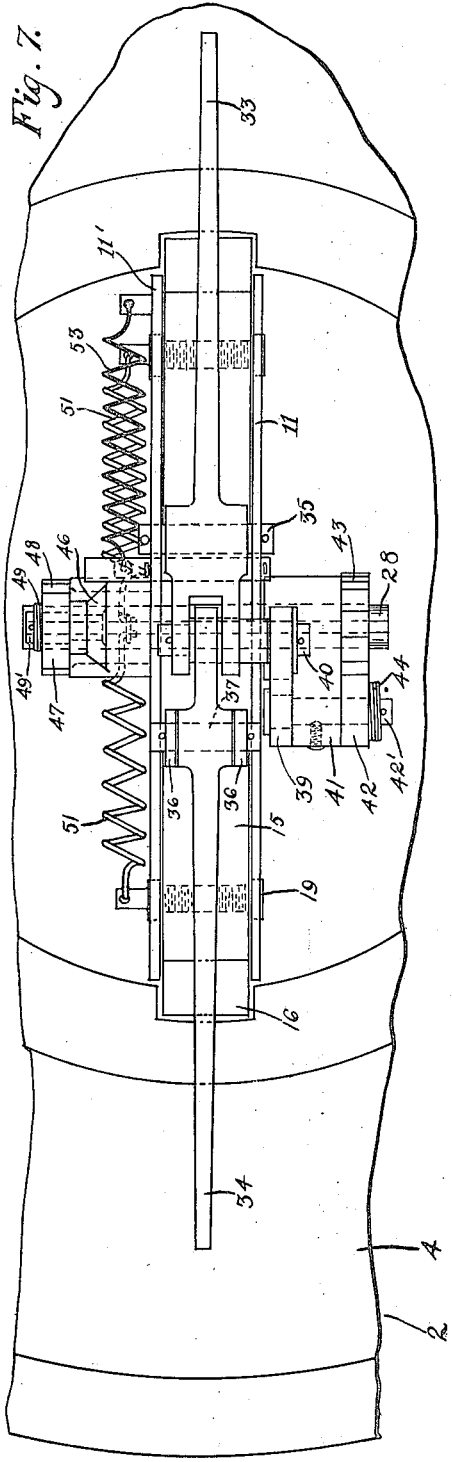
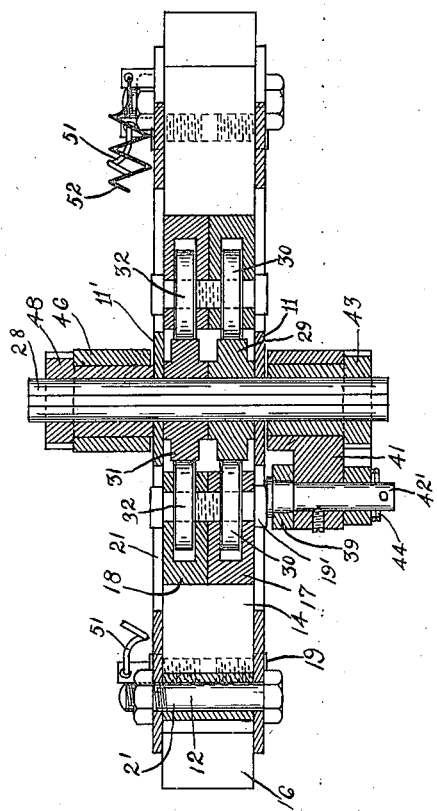

UNITED STATES PATENT OFFICE.

WILLIAM E. SIMPSON, OF DETROIT, MICHIGAN, ASSIGNOR TO PALMER-BEE COMPANY, OF DETROIT, MICHIGAN, A CORPORATION OF MICHIGAN.

CONVEYER AND MOLD SEPARATOR.

1,424,947.      Specification of Letters Patent.      Patented Aug. 8, 1922.

Application filed February 14, 1921. Serial No. 444,716.

*To all whom it may concern:*

Be it known that I, WILLIAM E. SIMPSON, a subject of the King of Great Britain and Ireland, residing at Detroit, in the county of Wayne and State of Michigan, have invented certain new and useful Improvements in Conveyer and Mold Separators, of which the following is a specification, reference being had therein to the accompanying drawings.

The invention relates to conveyers and is particularly applicable to conveyers for sectional molds in which the upper section of the mold is raised from the lower section during a portion of its travel and maintained in spaced relation to the lower section during another portion of its travel to permit of the finished work being removed and new work being inserted, and is then lowered to engage the lower section during still another portion of its travel. Heretofore, it has been the usual practice in conveyers of this type to manually initially separate the upper section from the lower section as by prying the same apart with crow bars or like tools before the upper section of the mold is raised from the lower; but this is unsatisfactory, since the time of several men is required and there is a possibility of damaging the mold sections.

It is the primary object of my invention to provide means for automatically initially separating the sections of the mold before raising the upper from the lower. Another object is the provision of an automatic mold breaker which, after initially separating the upper section and core of the mold from the lower section, will carry the same to a predetermined position where it will then automatically separate the upper section from the core. A further object is the provision of means for limiting the upward movement of the mold while the sections are being initially separated, thereby preventing a possible raising of the lower section of the mold to a too great height above the conveyer upon which it is being carried. The invention has for still further objects the novel features of construction and arrangements and combinations of parts as more fully hereinafter set forth.

In the drawings:

Figures 1ᵃ and 1ᵇ are side elevations in continuation of each other of a conveyer, a mold breaker and a portion of the apparatus for temporarily limiting the upward movement of the mold, showing the mold in section and the mold breaker in its operating positions;

Figure 2 is a front view of the mold breaker with a portion of the front plate broken away, showing the wedge members in original or inoperative position;

Figure 3 is a similar view showing the lower wedge members in operative positions;

Figure 4 is a similar view showing the upper wedge members in operative positions;

Figure 5 is a rear elevation of the mold breaker;

Figure 6 is an end elevation thereof;

Figure 7 is a top plan view thereof;

Figure 8 is a cross section on the line 8—8 of Figure 2;

Figure 9 is a cross section on the line 9—9 of Figure 1.

In the manufacture of vehicle tires, it has been the usual practice to provide a continuously moving conveyer for the sectional molds with a second conveyer thereabove moving in timed relation thereto and having an upwardly inclined portion, a substantially parallel portion and a downwardly inclined portion. This second conveyer carries the upper section of the mold away from the lower section, maintains the same thereabove while the cured tire is being removed and a green tire is being inserted and then lowers the upper section into engagement with its respective lower section. These molds have considerable weight, and furthermore, there is a partial vacuum within the mold after the tires have been cured so that it is with considerable difficulty that the upper section is separated from the lower section. Several men have been positioned along the lower conveyer at the point ahead of that where the upper conveyer engages the upper section of the mold, to initially separate these sections by prying the same apart with crow bars or like tools. This is an unsatisfactory method, since the time of several men is required and there is a possibility of damaging the mold sections. Furthermore, the sections may not be initially separated until the mold has been moved to a point beyond that where it may be engaged with the upper conveyer.

With my improved apparatus, the mold sections are automatically separated. In detail, and as shown particularly in Figure 1ª, 1 is the lower conveyer for the sectional molds 2, and 3 the upper conveyer for carrying the upper section 4 of the mold while the lower section 5 remains upon the conveyer 1. The upper conveyer has the upwardly inclined portion 6, the substantially horizontal portion 7 and the downwardly inclined portion 8 and continuously travels in timed relation to the continuous travel of the lower conveyer so that the upper section 4 of the mold will engage its respective lower section 5 when near the rear end of the upper conveyer 3. 9 are load carrying members upon the upper conveyer and 10 are the automatic mold breakers which are adapted to be connected to the load carrying members 9 near the forward end of the upper conveyer 3.

The frame of the mold breaker 10 comprises the front and rear side plates 11 and 11' respectively held in spaced relation by the sleeves 12 surrounding the bolts 12' and having the projections 13 at their upper edges. 14 and 15 are respectively pairs of oppositely extending lower and upper wedge members located between the plates and longitudinally slidably mounted thereon. These wedge members have the wedges 16 at their outer ends which occupy the space between the side plates of the frame and have at their inner ends the bifurcated portions 17 and 18 respectively which lie adjacent to each other and together occupy the space between the side plates. 19 and 19' are blocks respectively upon the wedge portions 16 and bifurcated portions 17 of the wedge members and slidably engaging in the longitudinal slots 20 and 21 respectively in the side plates.

The upper and lower sections 4 and 5 respectively of the mold 2 have the core 22 therebetween, which has the head 23 having the inclined side faces 24. The sections 4 and 5 at diametrically opposite points are provided with recesses 25 having inclined faces 26, the arrangement being such that the wedges 16 of the wedge members 14 and 15 may longitudinally move respectively into engagement between the lower section 5 and core 22 and upper section 4 and core 22, and wedge the same apart. To permit of insertion of the mold breaker within the mold, the upper section 4 of the mold at diametrically opposite points and registering with the recesses 25 is provided with the cut-away portions 27 of sufficient width to permit of ready passage of the wedges therethrough.

For the purpose of successively actuating the lower and upper wedge members 14 and 15 respectively, there is the following construction: 28 is a shaft extending transversely through the side plates 11 and 11'. 29 is a double cam having correspondingly shaped opposite ends for engaging the rollers 30 between the furcations 17 of the lower wedge members 14, and 31 is a similar cam for engaging the rollers 32 between the furcations 18 of the upper wedge members 15. The cams are so arranged that upon every third step by step rotation thereof, they will actuate the rollers to move the wedge members longitudinally outward. 33 and 34 are levers pivotally mounted upon the side plates 11 and 11' and pivotally connected to each other at their inner ends. As shown, the lever 33 is pivotally mounted upon the upward projections 13 as at 35, while the lever 34 is pivotally mounted upon the pair of links 36 as at 37, these links being in turn pivotally mounted at their lower ends upon the side plates as at 38. 39 is a link connected to the levers 33 and 34 by the common pivot 40. The lower end of this link is pivoted to the rock arm 41 which is rotatable upon the shaft 28 at the side of the front plate 11. 42 is a dog rotatably mounted upon the pivot 42' connecting the lower end of the link 39 and rock arm 41, and 43 is a ratchet wheel keyed upon the shaft 28 and having its teeth engageable by the lower end of the dog which latter is yieldably held in engagement with the ratchet wheel by means of the coil spring 44.

Figure 2 shows the parts when the wedge members are in original or inoperative position, and Figure 3 shows the parts when the lower wedge members 14 have been moved into operative position to initially separate the lower section 5 from the core 22. This is accomplished by connecting the lower ends of the cables 45 upon the load carrying member 9 of the upper conveyer 3 to the free ends of the levers 33 and 34 prior to the raising movement of the load carrying member. When this load carrying member travels along the upwardly inclined portion 6 of the upper conveyer, the levers 33 and 34 will be swung upwardly, thereby moving the link 39 downwardly and with it the dog 42 which will rotate the shaft 28 through one-sixth of a complete revolution and bring the actuating portions of the cam 29 into engagement with the rollers 30 upon the lower wedge members 14 to longitudinally move the latter outwardly and initially separate the lower section 5 of the mold from the core 22 and upper section 4.

For the purpose of actuating the mold breaker to permit of the return of the lower wedge members 14 to original or inoperative position and to actuate the upper wedge members 15 to separate the upper section 4 of the mold from the core 22, there is the lever 46 rotatably mounted upon the end of the shaft 28 beside the rear side plate 11' of the frame, and pivotally mounted upon this lever is the dog 47 which engages the teeth of the ratchet wheel 48 keyed upon the rear end of the shaft 28. This dog 47 is yieldably maintained in engagement with the teeth of the ratchet wheel by means of the coil spring 49 secured to the pivot 49' connecting the dog to the lever. 50 is a trip which, as shown, comprises an angle bar located beneath the point near the forward end of the substantially horizontal portion 7 of the upper conveyer 3, this trip being located at a height to engage the lever 46 and upon the continued forward movement of the mold breaker to swing the lever through one-sixth of a complete revolution, thereby rotating the shaft 28 through one-sixth of a complete revolution to bring the actuating portions of the cam 31 into engagement with the rollers 32 upon the furcations 18 of the upper wedge members 15 and to disengage the actuating portions of the cam 29 from its rollers 30. The lower wedge members 14 are connected to each other by means of the coil springs 51 secured to the blocks 19 so that upon disengagement of the actuating portions of the cam 29, these coil springs will retract the lower wedge members to original or inoperative position. Figure 4 shows the parts in their adjusted positions when the trip 50 is about to become disengaged from the lever 46. The upper wedge members 15 are similarly provided with the coil springs 52 which operate in the same manner. For the purpose of normally maintaining the lever 46 in original or inoperative position, there is the coil spring 53 connected at one end to the rear side plate 11' of the frame and connected at the opposite end to the lever.

For the purpose of varying the amount of raising movement of the load carriers 9 upon the upper conveyer, necessary to actuate the lower wedge members 14, the levers 33 and 34 are provided with the series of apertures 54 near their outer ends which can be engaged in by the hooks of the cables 45.

To prevent the raising of the lower section 5 of the mold 2 to too great a height above the lower conveyer 1 when the upper section 4 and core 22 are being raised, I have provided the mechanism 55 which temporarily limits the upward movement of the upper section and core and compels the longitudinal outward movement of the lower wedge members 14, the wedges of which slide between the inclined faces 26 of the lower section and 24 of the core, thereby separating the lower section from the core and upper section. As shown, this mechanism preferably comprises the rollers 56 connected to each other by suitable links 57 and passing around the sprocket wheels 58 and 59. These rollers are located above the lower conveyer at a distance sufficiently greater than the thickness of the molds to permit of the initial separation of the lower sections from the upper sections and cores, and the sprocket wheels 58 are so positioned that the molds pass out of engagement with the rollers immediately after the separation has taken place. To offer less resistance to the forward travel of the molds, the sprocket wheels 59 are driven so that the rollers will move at the same rate as the lower conveyer.

What I claim as my invention is:

1. The combination with a conveyer for sectional molds, of means for moving one of the sections of the mold away from another, and automatic means for initially separating the sections.

2. The combination with a conveyer for sectional molds, of means for moving one of the sections of the mold away from another, and means actuated by said moving means for initially separating the sections.

3. The combination with a conveyer for sectional molds having cores, of means for moving one of the sections with the core of the mold away from another section, and means for initially separating the first-mentioned section and the core from the second-mentioned section and for subsequently separating the core from the first-mentioned section.

4. The combination with a conveyer for sectional molds having cores, of means for moving one of the sections with the core of the mold away from another section, means actuated by said moving means for initially separating the first-mentioned section and the core from the second-mentioned section, and means for subsequently separating the core from the first-mentioned section.

5. The combination with a conveyer for sectional molds, of means for raising the upper section of a mold, and a wedge member actuated by said raising means for initially separating the upper and lower sections.

6. The combination with a conveyer for sectional molds having cores, of means for raising and conveying the upper section with the core of the mold in the direction of travel of the lower section, a wedge member actuated by said raising means to initially separate the upper section and the core of the mold from the lower section, a second wedge member engageable between the upper section and the core to separate the same, and means for actuating said second wedge member and for returning said first-mentioned wedge member to its original position.

7. The combination with a conveyer for sectional molds having cores, of a conveyer above the first-mentioned conveyer having an upwardly inclined portion, a load carrying member upon said upper conveyer, a mold breaker engageable with said load carrying member near the lower end of said upwardly inclined portion of the conveyer, a wedge member slidably mounted upon said mold breaker, means actuated upon the upward travel of the mold breaker for moving said wedge member into engagement with the lower section and the core of the mold to initially separate the same, a second wedge member slidably mounted upon said mold breaker, and means operable near the upper end of said upwardly inclined portion of the conveyer for moving said second wedge member into engagement with the upper section and the core of the mold to separate the same.

8. The combination with a conveyer for sectional molds having cores, of means for raising the upper section and the core of a mold, a mold breaker having a frame, a shaft extending transversely of said frame, wedge members for respectively initially separating the lower section from the upper section and core of the lower section from the upper section and core of the mold and the core from the upper section, cams upon said shaft for successively operating said wedge members upon said shaft, ratchet wheels upon said shaft, dogs engageable with said ratchet wheels to actuate the same, a lever pivotally mounted upon said frame and connected to one of said dogs to actuate the same upon raising movement of the mold breaker, a second lever pivotally mounted upon said frame and connected to the other of said dogs, and a trip for subsequently actuating said second lever.

9. In a breaker for sectional molds having cores, the combination with a frame having spaced side plates, of lower and upper wedge members respectively engageable between the lower section and the core and the core and the upper section of the mold to separate the same, said wedge members being slidably mounted on said plates, a shaft extending transversely through said plates, cams upon said shaft for respectively actuating said lower and upper wedge members, means for rotating said shaft and cams by a step by step movement to successively actuate said lower and upper cam members, and means for normally retaining said wedge members in original or inoperative position.

10. In a breaker for sectional molds having cores, the combination with a frame having spaced side plates, of lower and upper wedge members longitudinally slidably mounted upon said side plates and respectively engageable between the lower section and the core of the mold, and the upper section and the core of the mold, rollers at the inner ends of said wedge members, a shaft extending transversely through said side plates intermediate said rollers, cams upon said shaft engageable respectively with the rollers of said lower and upper wedge members, ratchet wheels upon the ends of said shaft, levers pivotally mounted upon said side plates, a link pivotally connected to said levers and movable downwardly upon rotation thereof, a dog connected to said link and yieldably held in engagement with one of said ratchet wheels, a second lever rotatably mounted upon said shaft, a dog upon said second lever yieldably held in engagement with the other ratchet wheel, and means for yieldably maintaining said second lever and wedge members in their original positions.

11. The combination with a conveyer for sectional molds, of means for moving one of the sections of the mold away from another, means for initially separating the sections, and means for limiting their movement in the direction of their separating movement while the same are being initially separated.

12. The combination with a continuously moving conveyer for sectional molds, of a second continuously moving conveyer above the first-mentioned conveyer, provided with an upwardly inclined portion, means for carrying the upper section of the mold and initially separating the same from the lower section, means upon said second conveyer engageable with said carrying means at the lower end of the upwardly inclined portion of said second conveyer, and a continuously moving member above the mold for temporarily limiting the upward movement of the same during the initial separation of its sections.

13. The combination with a conveyer for sectional molds, of means for raising one of the sections of the molds away from the other, means for initially separating the sections, and means for limiting the upward movement of one of the sections during the initial operation thereof.

14. The combination with a continuously moving conveyer for sectional molds, of means for raising one of the sections of the mold away from another, means for initially separating the sections, and a member moving continuously in timed relation to said conveyer and above one of the sections of the mold to temporarily limit the upward movement of the same during the initial separation of the sections.

15. The combination with a conveyer for sectional molds having cores, of means for moving one of the sections with the core of the mold away from another section, and means actuated by said moving means for initially separating the first-mentioned section and the core from the second-mentioned section.

16. The combination with mechanism for conveying a sectional mold, of mechanism operating in one portion of the travel of the mold to initially separate one section from another and to move said sections away from each other, said mechanism also operating in another portion of the travel of the mold to re-unite said sections.

In testimony whereof I affix my signature.

WILLIAM E. SIMPSON.